Dec. 25, 1956  A. SENKOWSKI ET AL  2,775,308
TRACTOR BODY GEARING COMPARTMENT ARRANGEMENT FOR
GEARING AND LUBRICATING OIL SUPPLY
Filed May 14, 1953  3 Sheets-Sheet 1

INVENTORS.
ALEXANDER SENKOWSKI &
FREDERICK D. COOPER
BY
ATTORNEYS.

INVENTORS.
ALEXANDER SENKOWSKI &
FREDERICK D. COOPER

Dec. 25, 1956 A. SENKOWSKI ET AL 2,775,308
TRACTOR BODY GEARING COMPARTMENT ARRANGEMENT FOR
GEARING AND LUBRICATING OIL SUPPLY
Filed May 14, 1953 3 Sheets-Sheet 3

INVENTORS.
ALEXANDER SENKOWSKI &
FREDERICK D. COOPER
BY
ATTORNEYS.

United States Patent Office 2,775,308
Patented Dec. 25, 1956

2,775,308

TRACTOR BODY GEARING COMPARTMENT ARRANGEMENT FOR GEARING AND LUBRICATING OIL SUPPLY

Alexander Senkowski, Earlsdon, Coventry, and Frederick D. Cooper, Stoke, Coventry, England, assignors to Massey-Harris-Ferguson (Sales) Limited, a British company Application May 14, 1953, Serial No. 354,906

Claims priority, application Great Britain May 16, 1952

5 Claims. (Cl. 180—54)

The invention relates to tractors of the type in which the supporting structure or body is constituted by a housing rigidly bolted to the engine assembly and enclosing the tractor driving and control mechanisms, and it is more particularly concerned with tractors of that type equipped with hydraulic power units.

In the operation of any hydraulic system, it is desirable for obvious reasons to keep the oil or other fluid medium free of foreign matter. This has been found difficult in the case of tractor hydraulic systems where considerations of simplicity and low initial cost make it most convenient to use in the hydraulic system the same oil with which the change-speed gears, tractor differential and other moving parts of the mechanism are lubricated. Oil used for lubrication under such conditions is likely to become contaminated with metallic swarf or other foreign particles thrown into the oil by the various gears. Furthermore, the oil, when constantly churned by the gears, may entrain sufficient air to interfere with the positive and accurate operation of the hydraulic system.

The primary object of the present invention is to provide a tractor body or housing embodying novel features of construction which eliminate or materially reduce the above-mentioned difficulties.

More particularly, one object of the invention is to provide a tractor body or housing adapted to isolate the oil used in the hydraulic system from that used for lubricating purposes to the extent necessary to keep the oil clean and free of metallic swarf or other foreign matter and to prevent entrainment of objectionable amounts of air in the oil.

A more specific object is to provide a tractor body or housing partitioned to define a compartment or auxiliary sump for the oil used in the hydraulic system and communicating with the main lubricating oil sump only at an elevated level effective to minimize transfer of swarf from the main sump to the auxiliary sump.

It is also an object of the invention to provide a sectional tractor body or housing with integral partitions dividing the housing into a series of separate compartments wherein the partitions are located so as to impart additional strength and rigidity to the housing sections.

Other objects and advantages of the invention will become apparent from the following detailed description of the preferred embodiment illustrated in the accompanying drawings in which.

Figure 1:
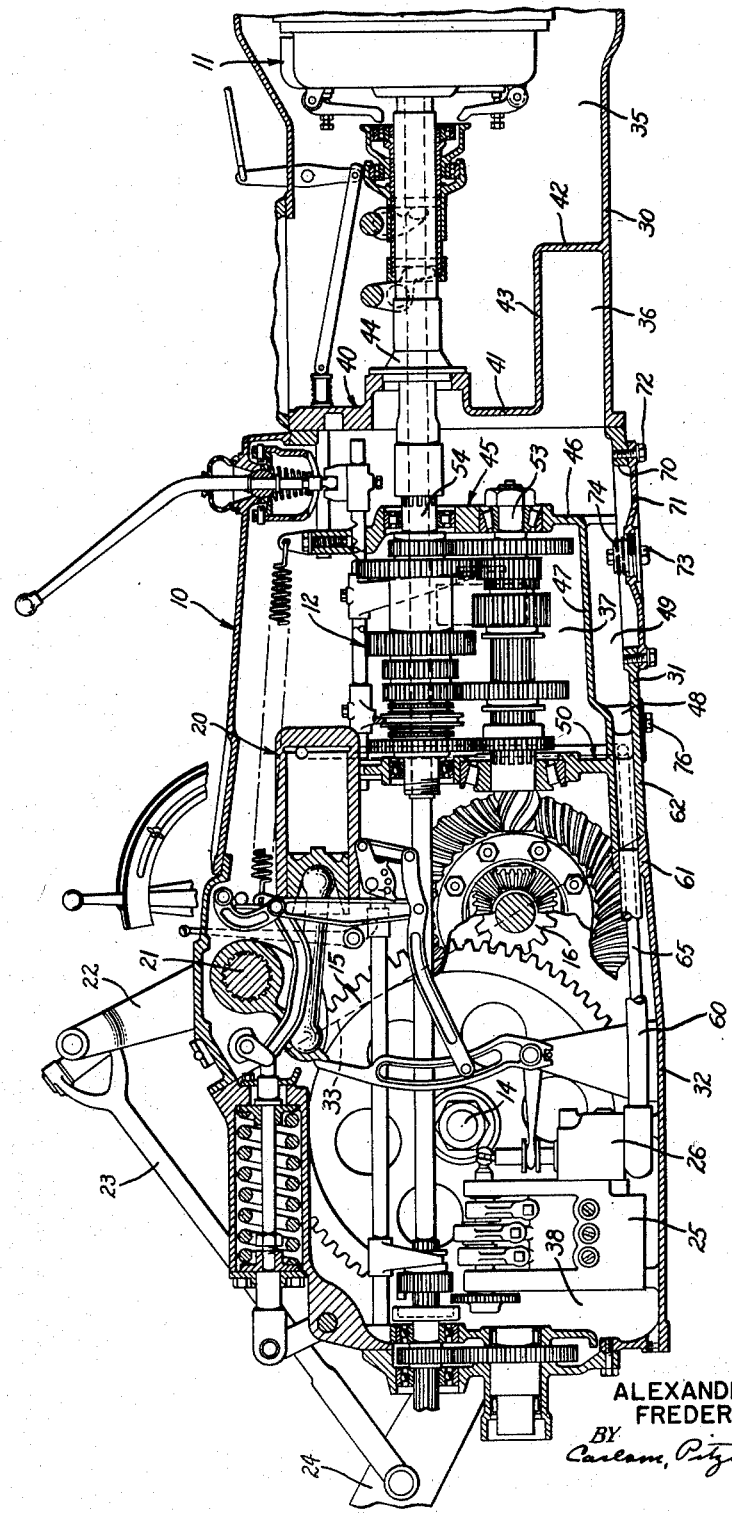
Figure 1 is a longitudinal sectional view of a tractor body or housing constructed in accordance with the invention.

For purposes of illustration, the invention has been shown in what is presently believed to be its preferred form. It is not intended, however, to limit the invention to the particular form shown but, on the contrary, it is the intention to cover all modifications and alternative constructions falling within the spirit and scope of the invention as expressed in the appended claims.

The tractor selected to illustrate the invention is a four-wheel tractor of intermediate size such as that shown in the co-pending application of Alexander Senkowski and Arthur Lynes, Serial No. 354,904 filed May 14, 1953. The tractor body or housing indicated generally at 10 is adapted to be bolted or otherwise rigidly secured at its forward end to the tractor engine (not shown) and is provided adjacent its rear end with conventional axle housings (not shown) supporting the tractor drive wheels.

The tractor body 10 serves as a housing for the tractor driving mechanisms including clutch mechanism 11 transmitting the engine power through change-speed gearing 12 and differential 13 to the rear axle shafts 14 by which the traction wheels are driven. It will be understood that separate axle shafts 14 are provided for the two traction wheels and in the exemplary tractor these axle shafts are separately driven through bull gears 15 keyed thereon and mashing with pinions 16 which constitute the output members of the differential 13.

The exemplary tractor is equipped with a hydraulic power unit and associated controls organized in a hydraulic system similar to that disclosed in the co-pending application of Alexander Senkowski and Frederick D. Cooper, Serial No. 386,822, filed October 15, 1953. The system includes a cylinder and piston actuator 20 operative through a rockshaft 21, crank arms 22 and drop links 23 to raise and lower a pair of draft links 24 trailingly pivoted on the tractor body by which implements are operatively connected to the tractor. Pressure fluid is supplied to the actuator 20 by a pump 25 under control of valve mechanism 26. Reference may be had to the companion application for a description of the construction and mode of operation of the hydraulic system.

The tractor body 10 in the preferred form illustrated is constructed in three sections 30, 31 and 32 bolted together in end to end relation. The front section 30 is adapted to be bolted to the engine assembly in the conventional manner. Body sections 30 and 31 constitute what may be conveniently called a transmission casing housing the clutch mechanism 11 and the change-speed gears 12. The intermediate and rear body sections 31 and 32 are preferably shaped to join in an oblique plane as indicated at 33 which, as shown in Fig. 1, passes through the axis of the differential 13. Those two sections form a compartment for housing the differential 13 and its gear connections with the axle shafts 14, the actuator 20, pump 25 and other elements of the hydraulic system.

The sections 30, 31 and 32 of the body 10 are preferably constructed in the form of castings. In accordance with the invention, the front section 30 and intermediate section 31 are formed with integral transverse walls or partitions dividing the body into a series of compartments completely or partially isolated from each other. Thus the body is divided by the partitions to provide a compartment 35 for the clutch mechanism 11 completely isolated from the rear portion of the body and therefore capable of operating "dry" or free of lubricating oil.

Next in succession behind the compartment 35 is a compartment 36 constituting an auxiliary oil sump followed by a compartment 37 housing the change-speed gearing 12 and at the rear a compartment 38 housing the differential and the elements of the hydraulic system. This rear compartment defines what may be called the main oil sump.

Compartments 35 and 36 are separated by a wall or partition 40 formed integrally with the front body section 30. As will be seen by reference to Fig. 1 of the drawings, the wall 40 comprises a generally vertical upper portion 41 and a vertical lower portion 42 offset forwardly from the upper portion and connected therewith by a horizontal wall 43. The upper wall portion 41 has an opening for the accommodation of the drive shaft extending between the clutch 11 and change-speed gearing 12. A member 44 fitted over the shaft seals the opening against leakage of oil into the compartment 35. The stepped formation of the wall 40 is advantageous in locating the upper portion of the partition relatively close to the juncture with the adjacent body section where it is effective to impart strength and rigidity to the casting. At the same time, forward offset materially increases the capacity of the compartment 36 forming the auxiliary sump.

Figure 6:
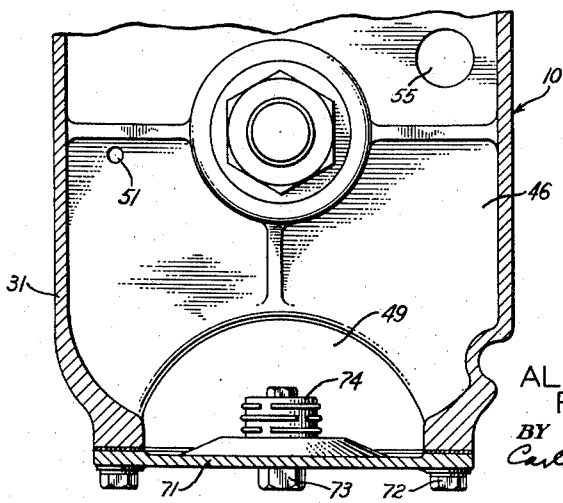
Fig. 6 is a fragmentary sectional view taken in a vertical plane substantially on the line 6—6 of Fig. 2.

A second transverse wall or partition 45 formed in the intermediate body section 31 separates the compartment 36 from the compartment 37. The upper portion 46 of the wall 45, which is preferably substantially vertical, need not extend to the top of the body section and moreover, it terminates above the bottom of the section in a rearwardly extending horizontal wall 47 constituting in this instance the bottom wall of the gear compartment 37. A seires of upright reenforcing webs 48 connect the wall 47 with the bottom wall of the section 31 and serve to close the rear portion of the compartment 36. The wall 47 may be arcuate in transverse section so as to define a semi-circular rearward extension 49 of the oil sump compartment 36 as shown in Fig. 6.

The rear wall of the compartment 37 is formed in this instance by a vertically disposed wall or partition 50 extending transversely across the body 31 and formed integrally therewith. By reference to Fig. 1, it will be observed that the partition 50 like the partition 45 does not extend completely to the top of the body section and therefore does not completely isolate compartment 37 from 38. Additional means of communication is afforded between the compartments 36, 37 and 38 to permit equalization of the oil level therein. Thus, the vertical section 46 of the wall 45 is formed with a small opening 51 (Fig. 6) defining a weir over which oil may flow from the compartment 36 to the compartment 37 and vice versa. Similarly, the wall 50 is formed with a relatively small hole 52 defining a weir substantially at the same horizontal level as the hole 51 to accommodate the flow of oil between compartments 37 and 38. Additionally, the partitions 45 and 50 are apertured to accommodate the bearings for shafts 53 and 54 of the change-speed gearing which afford passages for the flow of oil between the several compartments.

The small size of the holes 51 and 52 permit the oil to level off in the compartments 36, 37 and 38 while at the same time preventing surging of the oil between the compartments when the tractor pitches as when it is driven over rough ground. Furthermore, the holes are located a substantial distance above the bottom walls of the compartment. Thus, in effect, the compartments are separated by elevated weirs permitting flow of oil above a predetermined level but maintaining the main body of oil in each compartment relatively quiet so that metallic swarf or other foreign particles in the oil are allowed to settle to the bottom. The particles accordingly are trapped in the compartments in which they originate instead of passing from one to the other. As the major source of such swarf is the gear compartments, it will be apparent that the oil in the auxiliary sump 36 is kept relatively clean and suitable for use in the hydraulic system.

Preferably provision is made for filling the system with oil through the compartment or auxiliary sump 36 which may be provided with a conventional filler pipe (not shown) for that purpose. To cut down the time required for filling, partition 45 may be formed with a substantially larger opening 55 (Fig. 6) which will accommodate a more rapid flow from the sump 36 to the compartment 37 in case the filling rate raises the oil level in the sump above the hole 51. It will be observed, however, that the opening 55 is substantially above the normal oil level in the sump so that in the normal operation of the tractor little oil passes between the compartments through this opening.

In the exemplary tractor, the pump 25 is connected with the auxiliary sump 36 by a relatively large diameter conduit 60 extending forwardly from the valve mechanism 26 into a hollow boss 61 formed on the bottom wall of the body section 32. This boss in the body section 32 is adapted to register with a similarly shaped tubular fitting 62 formed in the bottom wall of the body section 31 and defining a passage through the wall 50 opening into the extension 49 of the auxiliary sump 36. A smaller conduit 65 (Figs. 1, 4 and 5) extends forwardly from the valve mechanism 26 to a hollow boss 66 formed on the bottom wall of the body section 32. The boss 66 registers with a duct 67 formed in the web 48 of the body section 31 which has an upwardly opening outlet port 68 connected by a conduit 69 with the closed end of the actuator cylinder. The conduits and ducts just described constitute conduit means accommodating the flow of pressure fluid to and from the actuator cylinder. The passage 67 and port 68 preferably formed by drilling and the openings other than those above mentioned are closed by suitable screw plugs 69.

Figure 2:
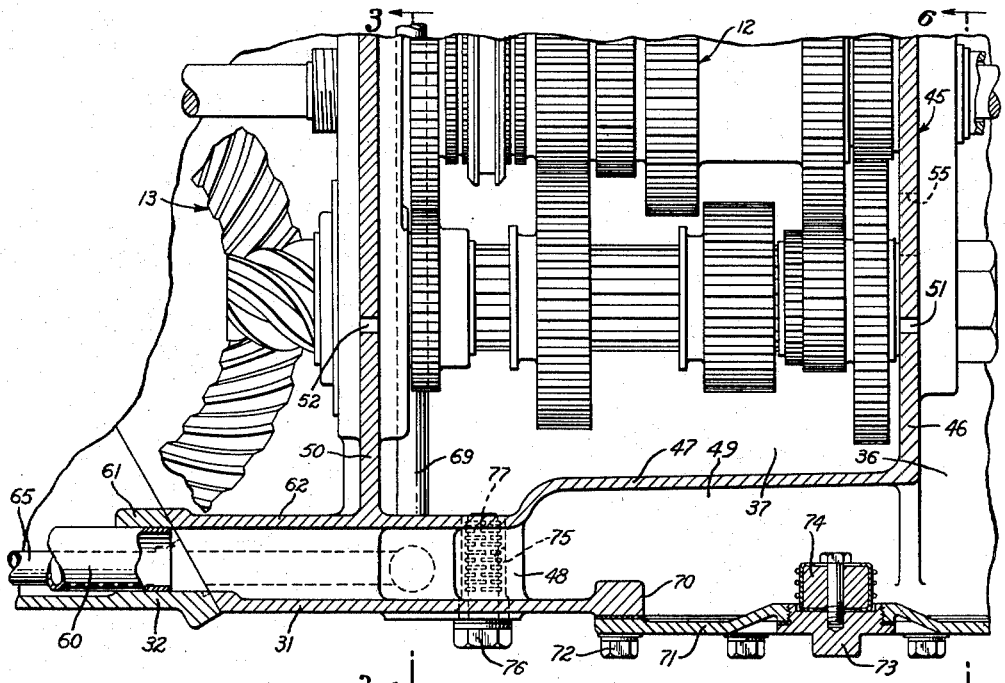
Fig. 2 is an enlarged fragmentary sectional view of the central portion of the tractor housing shown in Fig. 1.
Figure 3:
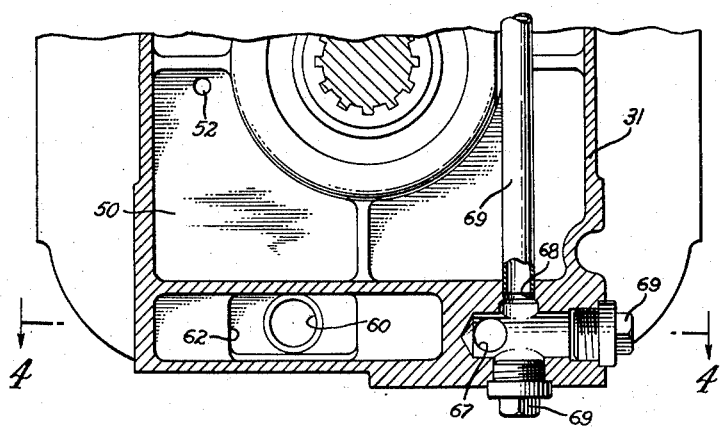
Fig. 3 is a fragmentary transverse sectional view taken in a vertical plane substantially on the line 3—3 of Fig. 2.
Figure 4:
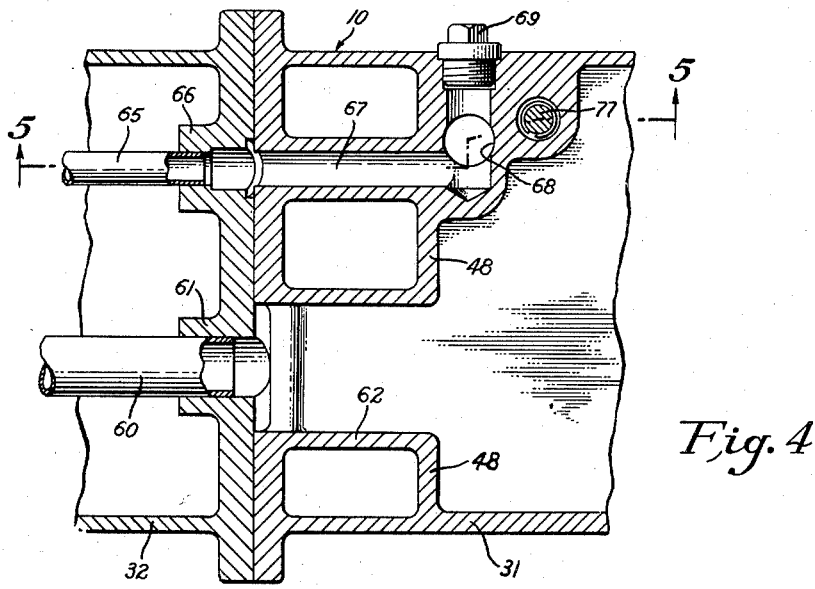
Fig. 4 is a fragmentary sectional view taken in a horizontal plane substantially on the line 4—4 of Fig. 3.
Figure 5:
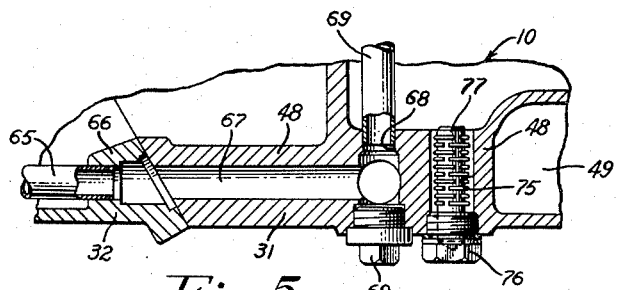
Fig. 5 is a sectional view taken in offset planes substantially on the line 5—5 of Fig. 4.

Provision is made for separately draining the auxiliary sump 36 and the gear compartment 37. As shown in Figs. 1, 2 and 6, the bottom wall of the body section 31 within the area below the sump 36 has a relatively large opening 70 closed by a cover plate 71 secured to the body section as by screws 72. The cover plate 71 is apertured centrally for reception of a threaded drain plug 73 which may be equipped with a magnetic swarf collector 74 of suitable and well-known construction. Drawings from the compartment 37 is by way of a passage 75 extending through the web portion 48 and the bottom wall of the body section 31. This passage is closed by a threaded drain plug 76 which may be fitted with a magnetic swarf collecting device 77 as shown in Figs. 4 and 5.

It will be apparent from the foregoing that the invention provides a tractor body or housing of novel and advantageous construction particularly suitable for tractors equipped with hydraulic power units. By reason of the novel compartmentations of the housing, the use of a common oil supply for lubricating purposes and for operation of the power unit is retained along with its advantages of simplified and lower cost construction. But operation of the power unit is improved and its useful life materially extended by keeping the oil immediately available for its use, clean and free of metallic swarf, particles of other foreign matter and entrained air.

We claim as our invention:

1. A tractor body comprising a series of three hollow castings joined together in end to end relation, a first partition in the front casting defining a dry clutch compartment, a second partition in the intermediate casting cooperating with the first partition to define an oil sump, a third partition in said intermediate casting cooperating with said second partition to define a change-speed gear compartment, said rear casting and the portion of said intermediate casting to the rear of said third partition defining a compartment for the tractor differential and a hydraulic unit including a pump, and conduit means connecting said pump with said oil sump.

2. A traactor body as defined in claim 1 in which the second and third partitions each have a restricted opening and at substantially the same level but spaced vertically from the bottom of the body to permit equalization of the oil level in the three rear compartments while minimizing the surging of the oil therein.

3. A tractor body as defined in claim 2 in which the second partition has a second opening larger than the first mentioned opening and located at a higher level to accommodate an increased flow of oil and thus permit rapid filling of the body through the oil sump.

4. A tractor body comprising, in combination, an elongated housing, partitions dividing said housing into front, rear and intermediate mechanism enclosing compartments, a pump located in the rear compartment, said partitions having openings connecting adjacent compartments to permit flow of oil from one compartment to another for lubrication of the mechanism enclosed therein, said openings being located substantially above the bottoms of the compartments so as to trap solid particles of foreign material or sludge produced by the mechanism in the respective compartments in which they originate, and conduit means connecting the inlet of said pump directly with said front compartment.

5. A tractor body as defined in claim 4 in which the openings in the partitions defining the compartments are dimensioned so as to prevent surging of oil between compartments when the tractor is driven over rough ground.

References Cited in the file of this patent

UNITED STATES PATENTS

| | | |
|---|---|---|
| Re. 20,291 | Bock | Mar. 9, 1937 |
| 1,109,002 | Maranville | Sept. 1, 1914 |
| 1,858,533 | White | May 17, 1932 |
| 1,878,379 | Church | Sept. 30, 1932 |
| 2,241,764 | Bollinger | May 13, 1941 |
| 2,302,637 | McCormick | Nov. 17, 1942 |
| 2,355,234 | Nickles | Aug. 8, 1944 |
| 2,506,671 | Jacobi | May 9, 1950 |
| 2,521,729 | Keese | Sept. 12, 1950 |